(12) United States Patent
Hanuschkiewitz et al.

(10) Patent No.: US 11,149,772 B2
(45) Date of Patent: Oct. 19, 2021

(54) LATCH CONNECTION MEANS FOR CONNECTING TWO COMPONENTS

(71) Applicant: HELLA GMBH & CO. KGAA, Lippstadt (DE)

(72) Inventors: David Hanuschkiewitz, Werne (DE); Sebastian Scholz, Soest (DE)

(73) Assignee: Hella GmbH & Co. KGaA, Lippstadt (DE)

(*) Notice: Subject to any disclaimer, the term of this patent is extended or adjusted under 35 U.S.C. 154(b) by 0 days.

(21) Appl. No.: 16/859,189

(22) Filed: Apr. 27, 2020

(65) Prior Publication Data

US 2020/0256364 A1 Aug. 13, 2020

Related U.S. Application Data

(63) Continuation of application No. PCT/EP2018/077477, filed on Oct. 9, 2018.

(30) Foreign Application Priority Data

Oct. 25, 2017 (DE) ...................... 10 2017 124 945.1

(51) Int. Cl.
*F16B 5/06* (2006.01)
*F21S 41/39* (2018.01)

(52) U.S. Cl.
CPC .......... *F16B 5/0642* (2013.01); *F16B 5/0664* (2013.01); *F21S 41/39* (2018.01)

(58) Field of Classification Search
CPC .......... F21S 41/39; F21S 41/47; F21S 41/198; F16B 5/0642; F16B 5/0064; F16B 2200/20; F16B 5/07; F16B 5/0664
See application file for complete search history.

(56) References Cited

U.S. PATENT DOCUMENTS

| 4,702,388 A | * | 10/1987 | Boyer | .................... H02G 3/083 |
| | | | | 220/305 |
| 4,969,072 A | * | 11/1990 | Pye | ........................ F21S 41/198 |
| | | | | 362/549 |

(Continued)

FOREIGN PATENT DOCUMENTS

| DE | 7526219 U | 1/1976 |
| DE | 102004054985 A1 | 6/2006 |

(Continued)

OTHER PUBLICATIONS

International Search Report dated Jan. 2, 2019 in corresponding application PCT/EP2018/077477.

(Continued)

*Primary Examiner* — William N Harris
(74) *Attorney, Agent, or Firm* — Muncy, Geissler, Olds & Lowe, P.C.

(57) ABSTRACT

A latching connector for connecting a first component to a second component, wherein a latching hook is formed on the first component and a latch opening is formed on the second component, and wherein, in order to connect the first component to the second component, the latching hook passes through the latch opening and engages behind the second component with a hook end. The latching hook has a securing section which adjoins the latching hook on a side facing away from the hook end and which can be latched in the latch opening.

11 Claims, 2 Drawing Sheets

(56) References Cited

U.S. PATENT DOCUMENTS

| | | | |
|---|---|---|---|
| 2007/0044990 A1 | 3/2007 | Shimadu | |
| 2011/0280034 A1* | 11/2011 | Tsukamoto | F21S 43/19 362/544 |
| 2015/0252973 A1* | 9/2015 | Muller | F21S 41/151 362/516 |
| 2016/0108945 A1* | 4/2016 | Yang | F16B 21/09 403/359.6 |
| 2017/0059111 A1* | 3/2017 | Shin | F21S 41/435 |
| 2018/0058639 A1* | 3/2018 | Blusseau | F21S 41/147 |

FOREIGN PATENT DOCUMENTS

| | | | | |
|---|---|---|---|---|
| DE | 102012103439 A1 | 10/2012 | | |
| EP | 2014520 A1 * | 1/2009 | | B60R 21/01 |
| FR | 2884014 A1 | 6/2005 | | |

OTHER PUBLICATIONS

Rear bumper reflector offered on Amazon since May 23, 2017, https://www.amazon.de/R%C3%BCckstrahler-Hinten_Sto%C3%9Fstange-Reflektoren-Vorfacelift/dp/B071FG8FLG/ref=sr_1_10?.

* cited by examiner

LATCH CONNECTION MEANS FOR CONNECTING TWO COMPONENTS

This nonprovisional application is a continuation of International Application No. PCT/EP2018/077477, which was filed on Oct. 9, 2018, and which claims priority to German Patent Application No. 10 2017 124 945.1, which was filed in Germany on Oct. 25, 2017, and which are both herein incorporated by reference.

BACKGROUND OF THE INVENTION

Field of the Invention

The present invention relates to a latching connector for connecting a first component to a second component, a latching hook being formed on the first component and a latch opening being formed on the second component, wherein, in order to connect the first component to the second component, the latching hook passes through the latch opening and engages behind the second component with one end of the hook.

Description of the Background Art

DE 10 2004 054 985 A1 discloses a latching connector for connecting a first component, for example an electronic component, to a second component, for example a circuit carrier, wherein a latching hook is attached to the first component, which can pass through a latch opening on the second component to connect the two components. When the two components are connected, the hook end of the latching hook engages behind the second component.

This type of latching connection is used to connect two components without requiring any further individual connecting elements. In order to connect the two components, the first action is to guide the latching hook through the latch opening, i.e., to bring the two components together. This is followed by a second action, whereby the two components are shifted plane-parallel to each other, so that the hook end of the latching hook can engage behind the second component. The result is a mechanically robust latching connection, wherein it must be ensured that the planar movement of the two components on each other cannot be reversed, allowing the latching hook to escape from the latch opening again. This is achieved by means of latch pins, which can engage in associated latching recesses, wherein the latch pins effectively latch into the latching recesses. This requires an elastic deformation of at least one of the two components, so that a certain minimum distance between the latch opening and the latching hook relative to the latch pin with the latching recess is required to even enable the elastic movement. Only then can the corresponding elasticity be used to lock the latch pin in the latching recess, whereas the latching hook will already extend through the latch opening and engage behind the second component with one end of the hook. However, this method of securing the latching connection is not possible for any given component geometry.

SUMMARY OF THE INVENTION

It is therefore an object of the present invention to improve a latching connector for connecting a first component to a second component, the latching connector being designed to be self-locking so that the two components do not become detached from one another in a plane-parallel direction even under mechanical stress relative to one another. In particular, the latching connector should be designed to be as space-saving as possible and secured against loosening.

In an exemplary embodiment, the invention includes the technical teaching that the latching hook comprises a securing section which is connected to the latching hook on the side facing away from the hook end and which can be engaged in the latch opening.

The invention is characterized in that the latching hook and the securing section are designed to be as uniform as possible, such that the securing section ensures that the latching end of the latching hook engages behind the second component, without the need for remotely located latching pins, which need to be latched into associated latching recesses. In particular, no elastic deformation of either of the two components is necessary, since even if the two components move away from each other in a planar manner, no deformation of the components is required in order to engage the latching hook with the hook end on the second component and at the same time to also engage the securing section in the latch opening. According to the invention, the latching hook and the securing section therefore interact together with the latch opening in the second component.

The securing section directly adjoins the formation of the latching hook on the first component, thus eliminating the need for a separate section of the first component between the latching hook and the securing section.

A particularly advantageous embodiment of the latching connector is formed when the securing section is configured as an elastically deformable spring tongue. If the latching hook is passed through the latch opening in an initial latching action by moving the two components towards one another in a planar manner, the securing section initially passes under the surface of the second component. If the two components are then moved away from one another in a planar manner, the latching hook with the hook end engages behind the second component, and due to a spring-back of the spring tongue the securing section can also latch in the latch opening at the same time. Prior to this, the movement of the two components towards each other results in an elastic pre-deformation of the securing section, and if the lateral movement of the two components towards each other is sufficient, the securing section engages with the latch opening by means of an elastic spring-back of the spring tongue. The dimensions of the latching hook and the spring tongue in relation to the dimensions of the latch opening may be such that the spring tongue engages in the latch opening just when the latching hook forms a firm connection devoid of mechanical play.

A further improvement is achieved when the latching hook is formed to protrude from a surface of the first component and the surface forms the contact surface with the second component, wherein the securing section also protrudes at least in sections from the same surface. The securing section protrudes only to the extent that the securing section springs back slightly elastically when both surfaces of the components are brought towards each other. When a lateral movement of the two components is initiated, the securing section engages in the latch opening by elastic spring-back.

The components can be of a planar configuration at least in sections, thereby providing a particular advantage in that the securing section is formed by means of a recess enclosing it in a section of the first component. If the first component is formed as an injection-molded plastic component, both the latching hook and also the securing section can be formed in one piece and using the same material as the first component by injection molding. The recess is also formed by injection molding, thereby already shaping the securing section, in particular by means of a deformable spring tongue, which is molded in one piece on the first component.

According to a feature of the invention, the latch opening has an elongated extension corresponding to the elongated extension from the latching hook along with the securing element. The latch opening need not necessarily be an elongated opening in the second component, and the latch opening may also have gradations, for example as a bearing surface formed below a surface of the second component. The latching hook may be designed in such a way that the latching end rests on the support surface when the second component is latched to the first component.

The latch opening may comprise a latching surface section against which a latching lug formed at the end of the securing section engages. In particular, the latching surface section is located opposite the bearing surface so that the latching surface section comes into operative connection with the securing element when the latching hook rests with the hook end on the bearing surface in the latch opening in order to engage behind the second component.

The latching hook and the securing section may together form a unit incorporated in a surface section of the first component, the unit being connectable to the first component by two lateral webs. In particular, to improve the manufacturability of the plastic component in injection molding, the area under the latching hook may have a window-shaped opening, allowing the first component to be produced in a single-stroke injection mold notwithstanding the design of the latching hook and the design of the securing section. For example, the first component forms an aperture element and the second component forms a reflector element of a light module of a vehicle headlamp.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
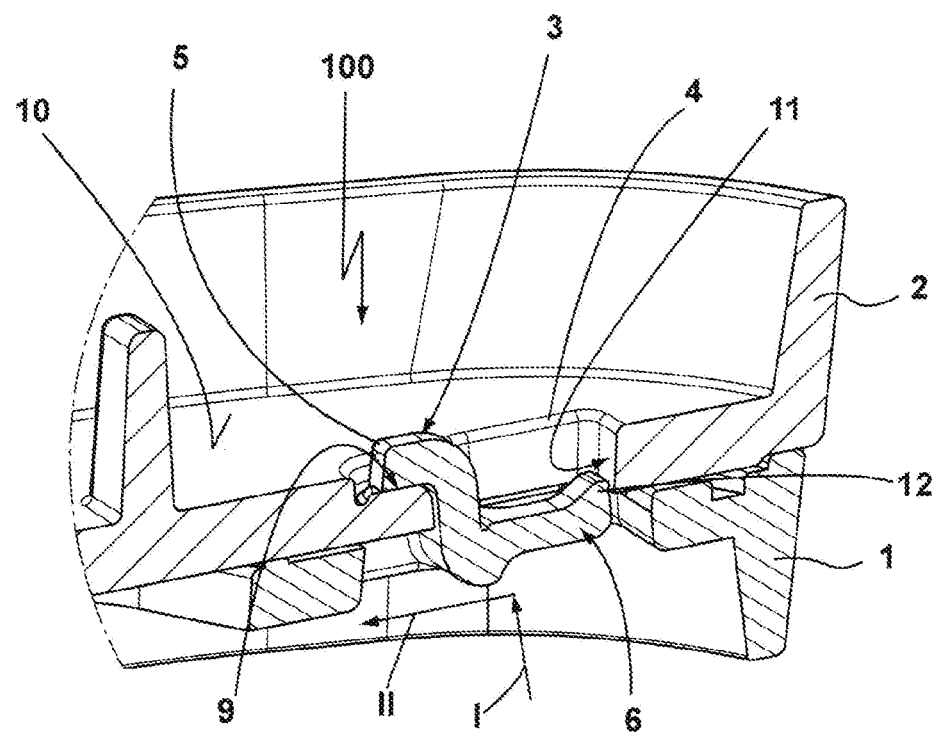
FIG. 1 is a perspective, transverse sectional view of the latching connector comprising a connection of the first component to the second component.

FIG. 1 shows a latching connector 100 in a perspective, cross sectional view, for connecting a first component 1 with a second component 2. The latching connector 100 has a latching hook 3, which is mounted on the first component 1. The latching hook 3 engages behind a section of the second component 2, and this section has a bearing surface 9, which is arranged slightly below the surface 10 of the second component 2. Due to this positive locking, the latching hook 3 holds the second component 2 in place against the first component 1. In order to establish this connection, the first component 1 is moved against the second component 2 with a first latching action I so that the latching hook 3 passes through a latch opening 4 in the second component 2. With a second latching action II, the hook end 5 of the latching hook 3 is pushed onto the bearing surface 9.

On the side adjoining the rear end of the latching hook 3 there is a securing section 6, in the form of a spring-elastic tongue with a latching lug 12 at the end. The latching lug 12 forms a positive fit against a latching surface section 11 of the latch opening 4 and thus holds the latching hook 3 with the hook end 5 on the bearing surface 9, thereby securing the established latched connection of the latching connector 100. It is only in the second latching action II that the latching lug 12 can engage against the latching surface section 11 by elastic spring-back of the spring tongue in a planar direction relative to the second component, provided that the first component 1 has sufficient movement path.

Consequently, a latching connection between the first component 1 and the second component 2 can be achieved by simple means, the latching connector 100 comprising a securing mechanism which is established by the securing section 6 interacting with the latch opening 4. The secured latching connection between the two components 1, 2 comprises only a few components, which can be accommodated in a small space, wherein the latching connector 100 can be formed integrally with the first component 1 in an injection molding process, for example.

Figure 2:
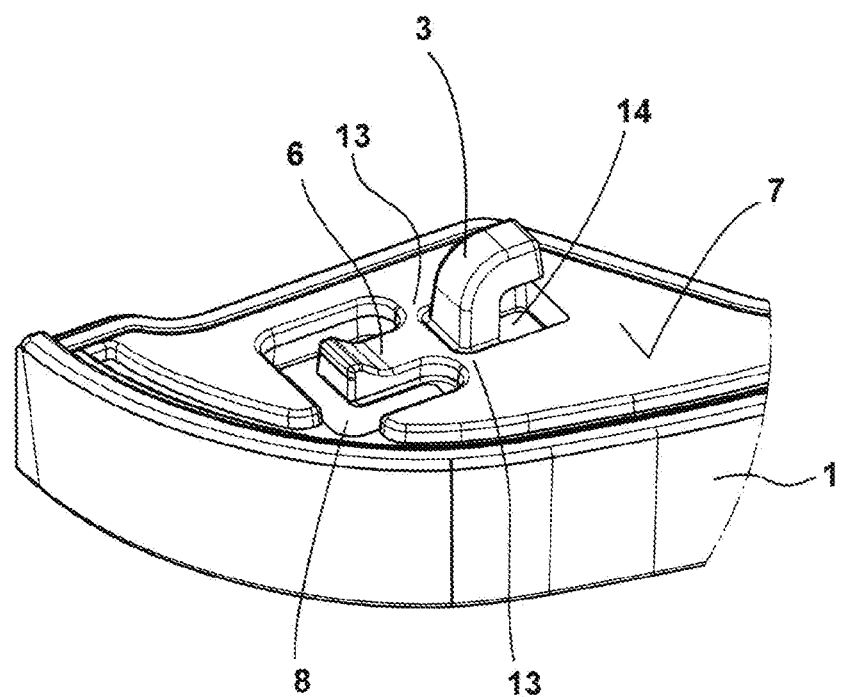
FIG. 2 is a perspective view of the first component with the latching hook and with the securing section designed in accordance with the invention.

FIG. 2 shows a perspective view of the first component 1 with a flat section and an upper side 7 from which the latching hook 3 protrudes, with a window-shaped opening 14 under the latching hook 3, thus enabling the first component 1 to be produced easily in a single-stroke injection mold. On the reverse side of the latching hook 3 there is the securing section 6, which is designed as a spring-elastic tongue. The securing section 6 is formed by a recess 8 in the flat section of the first component 1. The unit formed of the latching hook 3 and the securing section 6 is integrally formed on the first component 1 at two lateral webs 13.

The invention is not limited to the above-mentioned preferred embodiment. Rather, a number of variants are conceivable, which make use of the solution presented even if the design is fundamentally different. All features and/or advantages arising from the claims, the description or the drawings, including structural details, spatial arrangements and method steps, can be essential to the invention, both individually and in the most varied combinations.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A latching connector to connect a first component to a second component, the latching connector comprising:
   a latching hook formed on the first component;
   a latch opening formed on the second component and, in order to connect the first component to the second component, the latching hook is adapted to pass through the latch opening and engage behind the second component with a hook end; and a securing section formed on the latching hook, the securing section adjoining the latching hook on a side facing away from the hook end and which is adapted to be latched in the latch opening, wherein a free distal end of the securing section has a latching lug, wherein the latch opening has a latching surface section against which the latching lug engages, wherein the second component has a first surface that faces the first component and a second surface that opposes the first surface and faces away from the first component, and wherein the latching surface section extends perpendicular to the first surface and the second surface of the second component.

2. The latching connector according to claim 1, wherein the securing section is configured as an elastically deformable spring tongue.

3. The latching connector according to claim 1, wherein the latching hook protrudes from a surface of the first component which forms a contact surface with the second component, and wherein the securing section protrudes at least in sections from the surface.

4. The latching connector according to claim 1, wherein the securing section is partially surrounded by a recess in a surface section of the first component.

5. The latching connector according to claim 1, wherein the latch opening has an elongated extension corresponding to an elongated extension of the latching hook and the securing element.

6. A latching connector to connect a first component to a second component, the latching connector comprising:

a latching hook formed on the first component;

a latch opening formed on the second component and, in order to connect the first component to the second component, the latching hook is adapted to pass through the latch opening and engage behind the second component with a hook end; and a securing section formed on the latching hook, the securing section adjoining the latching hook on a side facing away from the hook end and which is adapted to be latched in the latch opening, wherein a free distal end of the securing section has a latching lug, wherein the latch opening has a latching surface section against which the latching lug engages, wherein the second component has a first surface that faces the first component and a second surface that opposes the first surface and faces away from the first component, wherein the latch opening has a bearing surface which is recessed from the second surface of the second component, opposes the first surface of the second component and faces away from the first component, and wherein the hook end of the latching hook rests on the bearing surface.

7. The latching connector according to claim 1, wherein the latching hook and the securing section form a unit, which is formed in a surface section of the first component, the unit being connected to the first component via two lateral webs.

8. The latching connector according to claim 1, wherein the first component is an aperture element and the second component is a reflector element of a lighting module for a headlamp of a vehicle.

9. The latching connector according to claim 1, wherein in a fully latched position of the latching connector, the hook end of the latching hook extends farther inside of the second component than the securing section.

10. The latching connector according to claim 1, wherein the hook end engages with the second component on an opposite side of the latch opening as the free distal end of the securing section.

11. The latching connector according to claim 6, wherein the bearing surface of the latch opening is parallel to the second surface of the second component.

* * * * *